United States Patent [19]

Allais et al.

[11] 3,856,909
[45] Dec. 24, 1974

[54] NOVEL QUINOLINES IN THE TREATMENT OF PAIN AND INFLAMMATION

[75] Inventors: André Allais, Les Lilas; Jean Meier, Coeuilly-Champigny; Jean Cerede, Dugny, all of France

[73] Assignee: Ranssel Uclaf, Paris, France

[22] Filed: Jan. 28, 1974

[21] Appl. No.: 437,151

Related U.S. Application Data

[62] Division of Ser. No. 241,405, April 5, 1971, Pat. No. 3,808,216.

[30] Foreign Application Priority Data

Apr. 8, 1971   France .............................. 71.12460

[52] U.S. Cl. ................................ 424/258, 424/248
[51] Int. Cl. ............................................. A61k 27/00
[58] Field of Search .................................... 424/258

Primary Examiner—Stanley J. Friedman
Attorney, Agent, or Firm—Hammond & Littell

[57] ABSTRACT

Novel 4-amino-quinolines of the formula

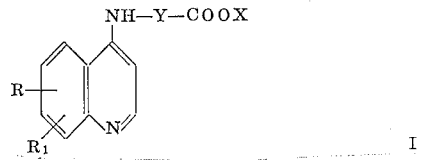

wherein R is selected from the group consisting of hydrogen, halogen, —CF$_3$, lower alkyl, lower alkoxy, lower alkylsulfonyloxy, lower alkylthio, nitro, lower alkylamino, lower acylamino and cyano, R$_1$ is selected from the group consisting of hydrogen, chlorine and methyl, Y is selected from the group consisting of 2,3 and 3,4-disubstituted thiophenes of the formula

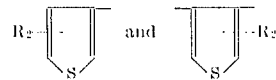

and 4,5 disubstituted thiazoles of the formula

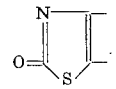

wherein R$_2$ and Q are selected from the group consisting of hydrogen and lower alkyl and X is selected from the group consisting of hydrogen, lower alkyl, a phenyl, diloweralkylamino lower alkylene, N-morpholino lower alkylene,

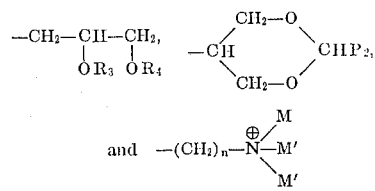

Z$^-$, R$_3$ and R$_4$ being hydrogen and taken together form

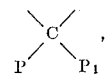

P and P$_1$ are lower alkyl, P$_2$ is selected from the group consisting of lower alkyl and monocyclic aryl, M and M' are lower alkyl, Z is halogen and n is an integer from 1 to 6, and their non-toxic, pharmaceutically acceptable acid addition salts having analgesic and anti-inflammatory activity and their preparation. Lower alkyl means having 1 to 6 carbon atoms.

19 Claims, No Drawings

NOVEL QUINOLINES IN THE TREATMENT OF PAIN AND INFLAMMATION

This is a division of Ser. No. 241,405, filed Apr. 5, 1971, now U.S. Pat. No. 3,808,216.

OBJECTS OF THE INVENTION

It is an object of the invention to provide the novel quinolines of formula I and their non-toxic, pharmaceutically acceptable acid addition salts.

It is a further object of the invention to provide a novel process for the preparation of the compounds of formula I.

It is another object of the invention to provide novel analgesic and anit-inflammatory compositions.

It is an additional object of the invention to provide a novel method of treating pain and/or inflammation in warm blooded animals.

These and other objects and advantages of the invention will become obvious from the following detailed description.

THE INVENTION

The novel products of the invention are selected from the group consisting of 4-amino-quinolines of the formula

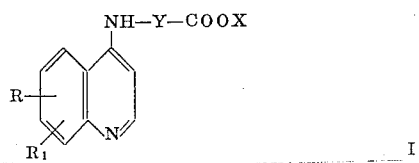

wherein R is selected from the group consisting of hydrogen, halogen, —$CF_3$, lower alkyl, lower alkoxy, lower alkylsulfonyloxy, lower alkylthio, nitro, lower alkylamino, lower acylamino and cyano, $R_1$ is selected from the group consisting of hydrogen, chlorine and methyl, Y is selected from the group consisting of 2,3 and 3,4-disubstituted thiophenes of the formula

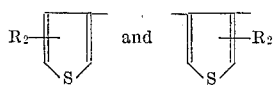

and 4,5 disubstituted thiazoles of the formula

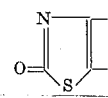

wherein $R_2$ and Q are selected from the group consisting of hydrogen and lower alkyl and X is selected from the group consisting of hydrogen, lower alkyl, a phenyl, diloweralkylamino lower alkylene, N-morpholino lower alkylene,

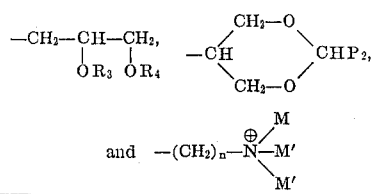

$Z^-$, $R_3$ and $R_4$ being hydrogen and taken together form

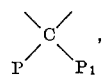

P and $P_1$ are lower alkyl, $P_2$ is selected from the group consisting of lower alkyl and monocyclic aryl, M and M' are lower alkyl Z is halogen and n is an integer from 1 to 6, and their non-toxic, pharmaceutically acceptable acid addition salts.

Examples of suitable acids for the formation of non-toxic, pharmaceutically acceptable acid addition salts are inorganic acids such as hydrochloric acid and sulfuric acid and organic acids such as acetic acid, tartaric acid and citric acid. Suitable halogens for R and Z are fluorine, chlorine, bromine and iodine.

Examples of specific compounds of the invention are 4-(2'-methoxycarbonyl-thienyl-3'-amino)-8-trifluoromethyl-quinoline and its hydrochloride, 4-(2'-carboxythienyl-3-amino)-8-trifluoromethyl-quinoline, the acetonide of 4-(2'-α-glyceryloxycarbonyl-thienyl-3'-amino)-8-trifluoromethyl-quinoline, 4-(2'-α-glyceryloxycarbonyl-thienyl-3'-amino)-8-trifluoromethyl-quinoline and its hydrochloride, 4-(3'-methoxycarbonyl-thienyl-4'-amino)-8-trifluoromethyl-quinoline and its hydrochloride, 4-(3'-carboxythienyl-4'-amino)-8-trifluoromethyl-quinoline, the acetonide of 4-(3'-α-glyceryloxycarbonyl-thienyl- 4'-amino)-8-trifluoromethyl-quinoline, 4-(3'-α-glyceryloxycarbonyl-thienyl-4'-amino)-8-trifluoromethyl-quinoline and its hydrochloride, 4-(3'-ethoxycarbonyl-5'-methyl-thienyl-2'-amino)-8-trifluoromethyl-quinoline and its hydrochloride, 4-(2'-methoxycarbonyl-thienyl-3'-amino)-7-chloro-quinoline and its hydrochloride, 4-(3'-carboxy-5'-methyl-thienyl-2'-amino)-8-trifluoromethyl-quinoline, 4-(2'-carboxythienyl-3'-amino)-7-chloro-quinoline, the acetonide of 4-(3'-α-glyceryloxycarbonyl-5'-methyl-thienyl-2'-amino)-8-trifluoromethyl-quinoline, the acetonide of 4-(2'-α-glyceryloxycarbonyl-thienyl-3'-amino)-7-chloro-quinoline, 4-(3'-α-glyceryloxycarbonyl-5'-methyl-thienyl-2'-amino)-8-trifluoromethyl-quinoline and its hydrochloride, 4-(2'-αglyceryloxycarbonyl-thienyl-3'-amino)-7-chloro-quinoline-and its hydrochloride, 4-(2'-N-morpholinoethoxy-carbonyl-thienyl-3'-amino)-8-trifluoromethyl-quinoline and its dihydrochloride and 4-(2'-dimethylaminoethoxy-carbonyl-thienyl-3'-amino)-8-trifluoromethyl-quinoline and its dihydrochloride.

The novel process of the invention for the preparation of the quinolines of formula I comprises reacting in the presence of a strong acid a 4-halo-quinoline of the formula

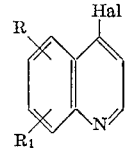

wherein Hal is chlorine or bromine and R and $R_1$ have the above meaning, with a compound of the formula

wherein Y has the above definition to form a compound of formula I.

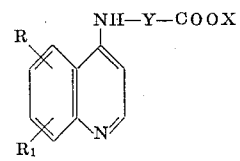

wherein X is lower alkyl in the form of a salt which is treated, if desired, with a base to obtain the corresponding free base. The said ester may be transformed by ester interchange into a compound of formula I:

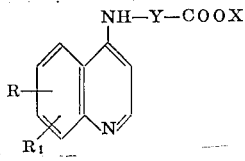

wherein X is other than hydrogen or lower alkyl or, if desired, by saponifying the said compound with a strong base to obtain a compound of formula I wherein X is hydrogen.

The acid addition salts of mineral or organic acids of the quinolines of formula I can be obtained by action with an appropriate acid and the quinolines.

Preferably, the condensation of halogenated quinoline of formula II with the compound of formula III is effected with a dilute aqueous solution of hydrochloric acid or sulfuric acid. Reaction of the salt of the lower alkyl ester is preferably effected with an organic base such as triethylamine, trimethylamine, pyridine or piperidine but inorganic bases such as alkali metal carbonates or bicarbonates may be used.

Saponification of the said lower alkyl esters of formula I may be effected by a strong base such as sodium hydroxide and potassium hydroxide in an alcohol such as a lower alkanol like methanol, ethanol or isopropanol. The said lower alkyl esters of formula I may be subjected to ester interchange with an alcohol other than a lower alkanol in the presence of an alkaline agent such as an alkali metal hydride, amide or alcoholate.

The free acid may be reacted in the presence of an acid catalyst with an alcohol other than a lower alkanol and the acid may be in the form of its acid halide or anhydride.

In one embodiment of the process, the lower alkyl ester of formula I is subjected to an ester interchange with an alcohol of the formula

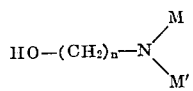

and the resulting ester is reacted with an alkyl halide of the formula $Z_1M'$ to obtain the compound of formula I wherein X is

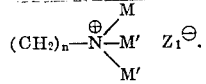

The said lower alkyl ester of formula I may also be subjected to ester interchange with an alcohol of the formula

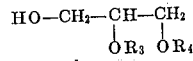

to obtain the ester of formula I wherein X is

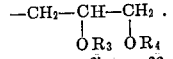

The ester interchange may first effected be with glycerine and the resulting 2,3-dihydroxypropyl ester is then reacted with a ketone of the formula

To form a compound of formula I wherein X is

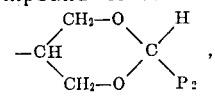

the said lower alkyl ester may be subjected to ester interchange with 2-$P_2$-5-hydroxy-1,3-dioxane or with 2-phenyl-5-hydroxy-1,3-dioxane followed by acid hydrolysis to obtain the corresponding β-glycerol ester which is then reacted with an aldehyde of the formula

The starting materials are known or can be easily prepared by known processes. 3-methoxycarbonyl-4-amino-thiophene has been described by BAKER et al. [J. Org. Chem., Vol 18 P 145 (1953)] and 2-methoxycarbonyl-3-amino-thiophene can be prepared by the processes described in British Pat. No. 827,086 and in German Pat. No. 1,055,007. 2-amino-3-methoxycarbonylthiophene can be prepared by the process described by GEWALD [Chem. Berichte, Vol. 98 (11) P 357 (1965)].

The 4-halo quinoline starting compounds are described in the literature (ALLAIS [Chim. Therapeutique, P 65–70 (1966)], or may be prepared by analogous methods such as by the process described in French Pat. No. 1,514,280 starting from a suitable aniline.

The analgesic and anti-inflammatory compositions of the invention are comprised of an effective amount of a compound of formula I or its non-toxic, pharmaceutically acceptable acid addition salts and a pharmaceutical carrier. The compositions may be in the form of injectable solutions or suspensions in ampoules or auto-injectable syringes or multiple dose flacons or in the form of tablets, coated tablets, gelules, sublingual tablets, syrups, emulsions, granules or aromatic powders, suppositories, creams, ointments, gels, drops, powders or collutoriums. The compositions may also contain other therapeutic principles such as spasmolytics, anticoagulants, antipyretics or sedatives.

The compositions due to their analgesic and anti-inflammatory activity are useful for the treatment of arthroses, lumbago, sciatic, shoulder pains and of myalgias. They ease pain, increase the mobility of joints, enlarge the perimeter of the gait and fight against anchylosis and inflammation.

The novel method of the invention for the treatment of pain and/or inflammation in warm-blooded animals comprises administering to warm-blooded animals an effective amount of a compound of formula I or a non-toxic, pharmaceutically acceptable acid addition salt thereof. The said compounds may be administered transcutaneously, orally, rectally, perlingually, topically or transmucously. The usual daily dose is 0.15 to 2 mg/kg depending on the condition being treated and the specific compound.

In the following examples there are described several preferred embodiments to illustrate the invention. However, it should be understood that the invention is not intended to be limited to the specific embodiments.

EXAMPLE I 4-(2'-methoxycarbonylthienyl-3'-amino)-8-trifluoromethyl-quinoline A mixture of 11.575 g of 4-chloro-8-trifluoromethyl-quinoline (obtained by process of Belgium Pat. No. 725,641), 7.85 g of 2-methoxycarbonyl-3-amino-thiophene and 55 ml of 2 N hydrochloric acid was refluxed with stirring for 3 hours and then the mixture was iced for 1 hour and vacuum filtered. The recovered precipitate was empasted with ice water, vacuum filtered and dried under reduced pressure at 80° C to obtain 16.45 g of raw 4-(2'-methoxycarbonylthieyl-3'-amino)-8-trifluoromethyl-quinoline hydrochloride.

The said raw product was dissolved in 20 ml of methanol with heating and the solution was filtered and the filter was washed with hot methanol. 7 ml of triethylamine were added to the combined filtrates and after icing for 1 hour, the mixture was vacuum filtered. The precipitate was washed with iced methanol and dried under vacuum. The residue was dissolved in 850 ml of refluxing methanol and the solution was filtered hot. The filter was washed with boiling methanol and the filtrate was cooled and then iced for 1 hour and vacuum filtered. The precipitate was empasted with iced methanol and dried in vacuo to obtain 9.73 gm of 4-(2'-methoxycarbonylthienyl-3'-amino)-8-trifluoromethyl-quinoline melting at 177°C. The product occurred as colorless needles soluble in chloroform, slightly soluble in methanol and ethanol and insoluble in water.

| Analysis: | $C_{16}H_{11}F_3N_2O_2S$; molecular weight = 352.33 | | | | |
|---|---|---|---|---|---|
| Calculated: | %C 54.54 | %H 3.15 | %F 16.18 | %N 7.95 | %S 9.10 |
| Found: | 54.2 | 3.3 | 16.0 | 7.6 | 8.8 |

I.R. Spectrum (chloroform)

Presence of associated NH at 3298 $cm^{-1}$, of carbonyl at 1675 $cm^{-1}$, of bands at 1621 and 1570 $cm^{-1}$ and of —$CF_3$.

Using the same procedure, 4-chloro-8-trifluoromethyl-quinoline and 2-amino-3-ethoxycarbonyl-5-methyl-thiophene were reacted to form 4-(3'-ethoxycarbonyl-5'-methyl-thienyl-2'-amino)-8-trifluoromethyl-quinoline melting at 158°C and 4,7-dichloro-quinoline and 2-methoxycarbonyl-3-amino-thiophene were reacted to form 4-(2'-methoxycarbonyl-thienyl-3'-amino)-7-chloro-quinoline melting at 159°C.

EXAMPLE II 4-(2'-carboxythienyl-3'-amino)-8-trifluoromethyl-quinoline

A mixture of 1.665 gm of 4-(2'-methoxycarbonyl-thienyl-3'-amino)-8-trifluoromethyl-quinoline, 150 ml of methanol and 10 ml of N sodium hydroxide was refluxed for 90 minutes and the mixture was then evaporated in vacuo to dryness. The residue was dissolved in 50 ml of water and the pH was adjusted 5 to 6 by addition of acetic acid. The mixture was iced for 1 hour and then vacuum filtered. The precipitate was washed with water and dried in vacuo at 100°C. The residue was dissolved in 65 ml of refluxing methanol and the solution was filtered hot. The filter was washed with 20 ml of boiling methanol and 58 ml of the solvent was distilled off at normal pressure. The mixture was iced for 1 hour and vacuum filtered. The precipitate was washed with iced methanol and dried in vacuo at 100° C to obtain 1.21 gm of 4-(2'-carboxythienyl-3'-amino)-8-trifluoromethyl-quinoline melting at 210°–215°C. The product occurred in the form of yellow needles soluble in methanol and ethanol, slightly soluble in chloroform and insoluble in water.

| Analysis: | $C_{15}H_9F_3N_2O_2S$; molecular weight = 338.30 | | | | |
|---|---|---|---|---|---|
| Calculated: | %C 53.25 | %H 2.68 | %F 16.85 | %N 8.28 | %S 9.48 |
| Found: | 53.2 | 2.9 | 17.1 | 8.0 | 9.6 |

I.R. Spectrum (Nujol)

Presence of C=O at 1 658 $cm^{-1}$

Using the same method, 4-(3'-ethoxycarbonyl-5'-methyl-thienyl-2'-amino)-8-trifluoromethyl-quinoline was saponified to obtain 4-(3'-carboxy-5'-methyl-thienyl-2'-amino)-8-trifluoromethyl-quinoline melting at 245°C and 4-(2'-methoxycarbonyl-thienyl-3'-amino)-7-chloro-quinoline was saponified to obtain 4-(2'-carboxy-thienyl-3'-amino)-7-chloro-quinoline melting at 260°C.

EXAMPLE III

Acetonide of 4-(2'α-glyceryloxycarbonyl-thienyl-3'-amino)-8-trifluoromethyl-quinoline 100 ml of 2,2-dimethyl-4-hydroxymethyl-1,3-dioxolane, 150 mg of a 50% oily suspension of sodium hydride and 12.27 gm of 4-(2'-methoxycarbonyl-thienyl-3'-amino)-8-trifluoromethyl-quinoline were mixed with agitation and the mixture was then heated under reduced pressure of 30 to 50 mm Hg for 3 hours at 90°C ± 5°C. The mixture was cooled to 20°C, and after 250 ml of water were added, the mixture was agitated for 20 minutes. The mixture was vacuum filtered and the precipitate was washed with ice water and dried in vacuo. The residue was dissolved in 60 ml of hot methylene chloride and the solution was filtered. The filter was washed with methylene chloride and after 400 ml of isopropyl ether were added to the filtrate, 360 ml of the solvent were distilled off. The residue was iced for 1 hour and vacuum filtered. The precipitate was washed with iced isopropyl ether and dried in vacuo to obtain 13.65 gm of the acetonide of 4-(2'α-glyceryloxycarbonyl-thienyl-3'-amino-8-trifluoromethyl-quinoline melting at 138°C. The product occurred in the form of colorless needles soluble in chloroform and alcohols and insoluble in water.

| Analysis: | $C_{21}H_{19}F_3N_2O_4S$; molecular weight = 452.44 | | | | |
|---|---|---|---|---|---|
| Calculated: | %C 55.74 | %H 4.23 | %F 12.60 | %N 6.19 | %S 7.09 |
| Found: | 56.0 | 4.4 | 12.6 | 6.0 | 7.3 |

Using the same procedure, 4-(3'-ethoxycarbonyl-5'-methyl-thienyl-2'-amino)-8-trifluoromethyl-quinoline was reacted to form the acetonide of 4-(3'-α-glyceryloxycarbonyl-5'-methyl-thienyl-2'-amino)-8-trifluoromethyl-quinoline melting at 139°C and 4-(2'-methoxycarbonyl-thienyl-3'-amino)-7-chloro-quinoline was reacted to form the acetonide of 4-(2'-α-glyceryloxycarbonyl-thienyl-3'-amino)-7-chloro-quinoline melting at 110°C, 4-(2'-methoxycarbonyl-thienyl-3'-amino)-8-trifluoromethyl-quinoline was reacted with β-N-morpholinoethanol and the product was then acidified with hydrochloric acid to form the dihydrochloride of 4-(2'-N-morpholinoethoxycarbonyl thienyl 3'-amino)-8-trifluoromethyl-quinoline (m.p. = 208°C), or with β-dimethylaminoethanol and the product was acidified with hydrochloric acid to form the dihydrochloride of 4-(2'-dimethylaminoethoxycarbonyl-thienyl-3'-amino)-8-trifluoromethyl-quinoline melting at 198°C.

EXAMPLE IV 4-(2'α-glyceryloxycarbonyl-thienyl-3'-amino)-8-trifluoromethyl-quinoline A mixture of 10.5 gm of the acetonide of 4-(2'-α-glyceryloxycarbonyl-thienyl-3'-amino)-8-trifluoromethyl-quinoline and 50 ml of water was heated with agitation at 95°C and after 5 ml of concentrated hydrochloric acid were added, the mixture was agitated for 15 minutes at 95°C–100°C and then iced for 1 hour and vacuum filtered. The product was dried in vacuo to form 10.04 gm of 4-(2'-α-glyceryloxycarbonyl-thienyl-3'-amino)-8-trifluoromethyl-quinoline hydrochloride melting at about 150°C. The 10.04 gm of hydrochloride were dissolved in 30 ml of warm methanol and after the solution was filtered, 5 ml of triethylamine were added to the filtrate. The mixture was iced for 1 hour and vacuum filtered. The precipitate was washed with iced methanol and dried in vacuo. The residue was dissolved in 55 ml of refluxing methanol and the solution was filtered hot. The filter was washed with boiling methanol and the filtrate was iced for 1 hour and vacuum filtered. The precipitate was washed with iced methanol and dried to obtain 7.15 gm of 4-(2'-α-glyceryloxycarbonyl-thienyl-3'-amino)-8-trifluoromethyl-quinoline melting at 163°C. The product occurred in the form of colorless needles soluble in ethanol, slightly soluble in chloroform and insoluble in water.

Analysis: $C_{18}H_{15}F_3N_2O_4S$; molecular weight = 410.38
Calculated: %C 52.42   %H 3.67   %F 13.82   %N 6.79   %S 7.77
Found:          52.5       3.3        14.2          6.6        7.6

I.R. Spectrum (Nujol)
Band at 1 583 $cm^{-1}$.

Using the same procedure, the hydrochloride of 4-(2'-α-glyceryloxycarbonyl-thienyl-3'-amino)-8-trifluoromethyl-quinoline was prepared by the action of hydrochloric acid on 4-(2'-α-glyceryloxycarbonyl thienyl-3'-amino)-8-trifluoromethyl-quinoline in a methanol solution. The said product became sticky at 170°C and had an instantaneous m.p. at about 200°C and the acetonide of 4-(3'-α-glyceryloxycarbonyl-5'-methyl-thienyl-2'-amino)-8-trifluoromethyl-quinoline was reacted to form 4-(3'-α-glyceryloxycarbonyl-5'-methyl-thienyl-2'-amino)-8-trifluoromethyl-quinoline melting at 205°C. Also, the acetonide of 4-(2'-α-glyceryloxycarbonyl-thienyl-3'-amino)-7-chloro-quinoline was reacted to form 4-(2'-α-glyceryloxycarbonyl-thienyl-3'-amino)-7-chloro-quinoline melting at 166°C.

EXAMPLE V 4-(3'-methoxycarbonyl-thienyl-4'-amino)-8-trifluoromethyl-quinoline

A mixture of 18.52 gm of 4-chloro-8-trifluoromethyl-quinoline, 17.2 gm of 3-methoxycarbonyl-4-aminothiophene hydrochloride and 90 ml of N hydrochloric acid was refluxed with agitation under an inert atmosphere for 45 minutes and, then was filtered. The filter was washed with hot N hydrochloric acid and the combined filtrates were ice-cooled for 1 hour and vacuum filtered. The precipitate was empasted with a little ice water and then was dissolved in 50 ml of hot methanol. 50 ml of water were added followed by 8.5 ml of triethylamine. The mixture was ice-cooled for 1 hour and vacuum filtered. The precipitate was washed with an iced methanol-water (1:1) mixture and dried in vacuo. The residue was dissolved in 1,250 ml of refluxing methanol and the solution was treated with active charcoal and filtered hot. The filter was washed with boiling methanol and the filtrate was concentrated to about 300 ml and then chilled for 1 hour and vacuum filtered. The precipitate was washed with iced methanol and dried in vacuo. The residue was recrystallized under the same conditions to obtain a 39% yield of 4-(3'-methoxycarbonyl-thienyl-4'-amino)-8-trifluoromethyl-quinoline melting at 193°–194°C. The product occurred as colorless needles soluble in chloroform, slightly soluble in alcohols and insoluble in water.

Analysis: $C_{16}H_{11}F_3N_2O_2S$; molecular weight = 352.33
Calculated: %C 54.54   %H 3.15   %N 7.95   %F 16.18   %S 9.10
Found:          54.2       3.1        7.8        16.1        9.4

I.R. Spectrum (chloroform)
Presence of C=O at 1 696 $cm^{-1}$ and of NH at 3 333 $cm^{-1}$

EXAMPLE VI 4-(3'-carboxy-thienyl-4'-amino)-8-trifluoromethyl-quinoline

A mixture of 3.81 gm of 4-(3'-methoxycarbonyl-thienyl-4'-amino)-8-trifluoromethyl-quinoline, 50 ml of methanol and 30 ml of 2 N sodium hydroxide was refluxed for 1 ½ hours under an inert atmosphere and the methanol expelled under partial vacuum. 70 ml of water were added and the mixture was heated to 80°C, and then filtered. The filter was washed with boiling water and to the combined filtrates 6 ml of acetic acid at 80°C were added. The mixture was ice-cooled for 1 hour and vacuum filtered. The precipitate was washed with water and dried in vacuo at 80°C. The residue was dissolved in 150 ml of refluxing methanol and the solution was filtered hot. The filter was washed with 25 ml of boiling methanol and 120 ml of the solvent distilled off. The mixture was ice-cooled for 1 hour and vacuum filtered. The precipitate was washed with iced methanol and dried in vacuo at 80°C to obtain 3.4 gm of 4-(3'-carboxy-thienyl-4'-amino)-8-trifluoromethyl-quinoline melting at 200°C. The product occurred in the form of yellow needles soluble in alkaline aqueous solutions, slightly soluble in methanol and acetone and insoluble in water and chloroform.

Analysis: $C_{15}H_9F_3N_2O_2S$; molecular weight = 338.30
Calculated: %C 53.25   %H 2.68   %N 8.28   %F 16.85   %S 9.48
Found:          53.6       3.0        8.1        16.5        9.4

I.R. Spectrum (Nujol)
Presence of acid. Absorption region of associated NH OH.

EXAMPLE VII

Acetonide of 4-(3'-α-glyceryloxycarbonyl-thienyl-4'-amino)-8-trifluoromethyl-quinoline 100 ml of 2,2-dimethyl-4-hydroxymethyl-1,3- dioxolane and 200 mg of sodium hydride in a 60% suspension in vaseline oil was mixed, 11.4 gm of 4-(3'-methoxycarbonyl-thienyl-4'-amino)-8-trifluoromethyl-quinoline were added thereto. The mixture was agitated at a vacuum of 30 mm Hg and heated for 5 hours at 83°C and then cooled to 25°C under vacuum. 200 ml of water were added at normal pressure and with agitation, and the mixture was agitated for 20 minutes and vacuum filtered. The precipitate was washed with water and dried in vacuo at 80°C. The residue was dissolved in 250 ml of isopropyl ether and 50 ml of methylene chloride at reflux and the solution was treated with active charcoal and filtered hot. The filter was washed with 150 ml of a hot isopropyl ether-methylene chloride mixture (5:1) and then 260 ml of the solvents distilled off from the filtrate. The mixture was ice-cooled for 1 hour and vacuum filtered. The precipitate was washed with iced isopropyl ether and dried in vacuo at 80°C to obtain 11.53 gm of the acetonide of 4-(3'-α-glyceryloxycarbonyl-thienyl-4'-amino)-8-trifluoromethyl-quinoline melting at 137°C. The product occurred as a colorless solid soluble in chloroform, alcohols and acetone and insoluble in water.

Analysis: $C_{21}H_{19}F_3N_2O_3S$; molecular weight = 452.44
Calculated: %C 55.75 %H 4.23 %N 6.19 %F 12.60 %S 7.09
Found: 55.7 4.5 5.7 12.6 7.2

I.R. Spectrum (chloroform)
Presence of C=O at 1 704$^{cm-1}$, of cyclic C—O—C at 3 333$^{cm-1}$, of aromatic and conjugated C=C at 1 595, 1 585, 1 569, 1 538 and 1 508$^{cm-1}$ and of -CF$_3$

EXAMPLE VIII 4-(3'-α-glyceryloxycarbonyl-thienyl-4'-amino)-8-trifluoromethyl-quinoline 8 gm of the acetonide of 4-(3'-α-glyceryloxycarbonyl-thienyl-4'-amino)-8-trifluoromethyl-quinoline were suspended in 48 ml of water and the mixture heated to 95°C. 4 ml of concentrated hydrochloric acid were added thereto and the mixture was agitated for 10 minutes at 95°C. The solution was brought back to room temperature, and after a solution of 10 gm of sodium acetate in 20 ml of water was added, the mixture was ice-cooled for 1 hour and vacuum filtered. The precipitate was empasted with water and dried in vacuo at 80°C. The residue was dissolved in 350 ml of refluxing acetone and the solution was filtered. The filter was washed with 100 ml of hot acetone and 370 ml of the solvent was distilled off. The mixture was ice-cooled for 1 hour and vacuum filtered. The precipitate was washed with iced acetone and dried in vacuo at 80°C to obtain 5.34 gm of 4-(3'-α-glyceryloxycarbonyl-thienyl-4'-amino)-8-trifluoromethyl-quinoline melting at 192°-193°C. The product occurred in form of yellow needles soluble in ethanol, slightly soluble in methanol and acetone and insoluble in water and chloroform.

Analysis: $C_{18}H_{15}F_3N_2O_4S$; molecular weight = 412.38
Calculated: %C 52.42 %H 3.67 %N 6.80 %F 13.82 %S 7.77
Found: 52.6 3.7 6.4 13.4 8.1

I.R. Spectrum (Nujol)
Presence of C=O at 1 696$^{cm-1}$ and of C=C and aromatic at 1 623, 1 597, 1 547 and 1 512$^{cm-1}$.

PHARMACOLOGICAL STUDY

A. Analgesic Activity

The test used was based on the fact noted by R. Koster et al. (Fed. Proc., 1959, Vol. 18, Page 412) wherein the intraperitoneal injection of acetic acid causes in mice characteristic repeated stretching and twisting movements which can persist for more than 6 hours. Analgesics prevent or surpress this syndrome which, therefore, can be considered as externalization of a diffuse abdominal pain.

A solution of 6% acetic acid in water containing 10% arabic gum was used and the dose which released the syndrome under these conditions was 0.01 cc/gm, that is 60 mg/kg of acetic acid. The test compounds were administered orally one-half hour before the intraperitoneal injection of acetic acid, the mice having fasted since the night before the experiment. For each dose and for each control, which are obligatory for each test, a group of 5 animals was used. For each mouse, the stretchings were observed and counted and then added for the group of 5 during a period of 15 minutes starting immediately after the injection of acetic acid.

Table I summarizes the results.

Table I shows that the 3 compounds possess a considerable analgesic activity and that their 50% active doses (DA$_{50}$) are 500 to 1 mg/kg, 2 mg/kg and 5 mg/kg respectively.

TABLE I

| Product | Administered doses | % of Protection |
|---|---|---|
| 4-(2'-carboxy-thienyl-3'-amino)-8-trifluoromethyl-quinoline | 200 γ /kg | 0 |
| | 500γ /kg | 47 |
| | 1 mg/kg | 57 |
| | 2 mg/kg | 68 |
| | 5 mg/kg | 77 |
| | 10 mg/kg | 92 |
| | 20 mg/kg | 90 |
| | 50 mg/kg | 92 |
| 4-(2'-α-glyceryloxycarbonyl-thienyl-3'-amino)-8-trifluoro-methyl-quinoline | 1 mg/kg | 31 |
| | 2 mg/kg | 51 |
| | 5 mg/kg | 55 |
| | 10 mg/kg | 80 |
| | 20 mg/kg | 92 |
| | 50 mg/kg | 80 |
| | 100 mg/kg | 93 |
| Acetonide of 4-(2'-α-glyceryloxy-carbonyl-thienyl-3'-amino)-8-trifluoromethyl-quinoline | 2 mg/kg | 0 |
| | 5 mg/kg | 50 |
| | 10 mg/kg | 68 |
| | 20 mg/kg | 77 |
| | 50 mg/kg | 91 |
| | 100 mg/kg | 96 |

B. Anti-inflammatory Activity

The test was the slightly modified test of BRANCENI et al. [Arch. Int. Pharmacodyn., (1954) Vol. 152, Pg 15]. It consists of administering to rats weighing about 150 gm, a single injection of 1 mg of naphthoylheparamine (N.H.A.) under the *plantar aponerosis* aponevrosis of a hind paw. This injection is intended to provoke the formation of an inflammatory edema. The test products are administrated orally in an aqueous suspension 1 hour before the irritating injection. The inflammation is measured by plethysmography with an electrical plethysmometer and the paw is measured immediately before and 2 hours after the irritating injection. The increase in the volume of the paw between the two measurements represents the degree of inflammation. The average degree of inflammation for each group is expressed in absolute values and in percentage of those of the control animals. Under these conditions, the most adequate active standard dosage for calculating the activity of a product is the $DA_{40}$ or the dosage which diminishes the degree of inflammation by 40% in comparison to that of the controls. The products tested were in an aqueous suspension and were administered at increasing doses. The obtained results are in Table II.

TABLE II

| | Administered doses in mg/kg | Increase of the volume of the paw after 2 hrs | Degree of inflammation in % of that of the controls |
|---|---|---|---|
| 4-(2'-carboxy-thienyl-3'-amino)-8-trifluoromethyl-quinoline | Controls | 29.4 | — |
| | 50 | 14.3 | 52 |
| | Controls | 24.3 | — |
| | 20 | 19.4 | 26 |
| 4-(2'-α-glyceryloxycarbonyl-thienyl-3'-amino)-8-trifluoromethyl-quinoline | Controls | 27.5 | — |
| | 10 | 18.0 | 35 |
| | Controls | 31.4 | — |
| | 20 | 19.9 | 37 |
| | Controls | 29.4 | — |
| | 50 | 16.1 | 45 |
| Acetonide of 4-(2'-α-glyceryloxycarbonyl-thienyl-3'-amino)-8-trifluoromethyl-quinoline | Controls | 27.5 | — |
| | 10 | 22.0 | 20 |
| | Controls | 31.4 | — |
| | 50 | 17.9 | 43 |

Table II shows that the 3 products possess a clear anti-inflammatory activity and that their $DA_{40}$ are 33 mg/kg, 25 mg/kg and 40 mg/kg respectively.

Various modification of the compositions and methods of the invention may be made without departing from the spirit or scope thereof and it is to be understood that the claims are to be limited as defined in the appended claims.

We claim:

1. An analgesic and anti-inflammatory composition comprising an effective amount of a compound selected from the group consisting of 4-amino-quinolines of the formula

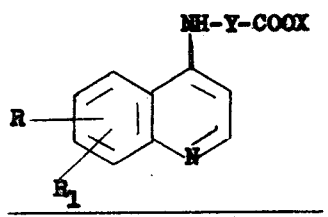

wherein R is selected from the group consisting of hydrogen, halogen, —$CF_3$, lower alkyl, lower alkoxy, lower alkylsulfonyloxy, lower alkylthio, nitro, lower alkylamino, lower alkanoylamino and cyano. $R_1$ is selected from the group consisting of hydrogen, chlorine and methyl, Y is selected from the group consisting of 2,3 and 3,4-disubstituted thiophenes of the formula

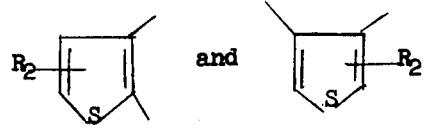

and 4, 5 disubstituted thiazoles of the formula

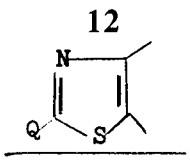

wherein $R_2$ and Q are selected from the group consisting of hydrogen and lower alkyl and X is selected from the group consisting of hydrogen, lower alkyl, phenyl, diloweralkylamino lower alkylene,

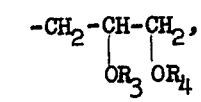

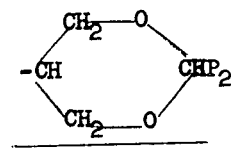

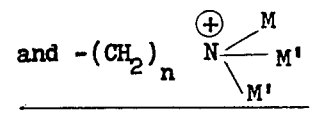

$Z^-$, $R_3$ and $R_4$ being hydrogen and taken together form

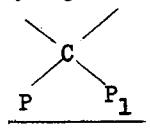

P and $P_1$ are lower alkyl, $P_2$ is selected from the group consisting of lower alkyl, M and M' are lower alkyl, Z is halogen and n is an integer from 1 to 6 and their non-toxic, pharmaceutically acceptable acid addition salts and a pharmaceutical carrier.

2. A method of treating pain and/or inflammation in warm-blooded animals comprising administering to warm-blooded animals an effective amount of a compound selected from the group consisting of 4-amino-quinolines of the formula

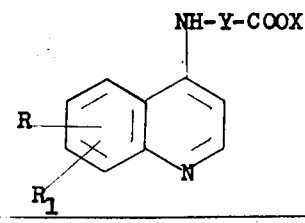

wherein R is selected from the group consisting of hydrogen, halogen, —$CF_3$, lower alkyl, lower alkoxy, lower alkylsulfonyloxy, lower alkylthio, nitro, lower alkylamino, lower alkanoylamino and cyano, $R_1$ is selected from the group consisting of hydrogen, chlorine and methyl, Y is selected from the group consisting of 2,3 and 3,4-disubstituted thiophenes of the formula

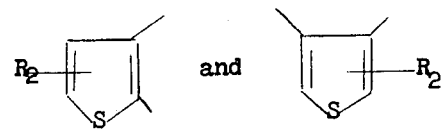

and 4, 5 disubstituted thiazoles of the formula

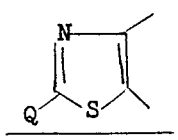

wherein $R_2$ and Q are selected from the group consisting of hydrogen and lower alkyl and X is selected from the group consisting of hydrogen, lower alkyl, phenyl, diloweralkylamino lower alkylene,

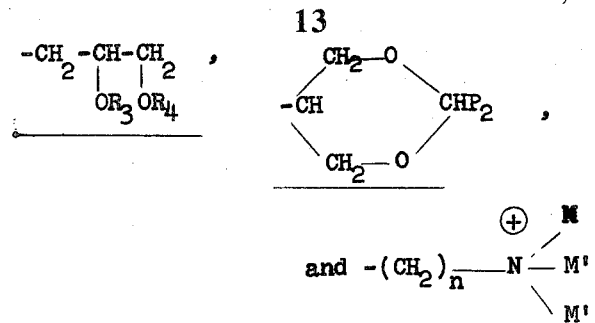

and 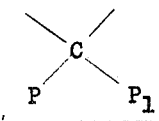

$Z^-$, $R_3$ and $R_4$ being hydrogen and taken together form

```
    \   /
     C
    / \
   P   P₁
```

P and $P_1$ are lower alkyl, $P_2$ is selected from the group consisting of lower alkyl, M and M' are lower alkyl, Z is halogen and n is an integer from 1 to 6 and their nontoxic, pharmaceuitcally acceptable acid addition salts.

3. The method of claim 2 which is selected from the group consisting of 4-(2'-methoxycarbonyl-thienyl-3'-amino)-8-trifluoromethyl-quinoline and its hydrochloride.

4. The method of claim 2 which is selected from the group consisting of 4-(2'-α-glyceryloxycarbonyl-thienyl-3'-amino)-8-trifluoromethyl-quinoline and its hydrochloride.

5. The method of claim 2 which is selected from the group consisting of 4-(3'-methoxycarbonyl-thienyl-4'-amino)-8-trifluoromethyl and its hydrochloride.

6. The method of claim 2 which is selected from the group consisting of 4-(3'-α-glyceryloxycarbonyl-thienyl-4'-amino)-8-trifluoromethyl-quinoline and its hydrochloride.

7. The method of claim 2 which is selected from the group consisting of 4-(3'-ethoxycarbonyl-5'-methyl-thienyl-2'-amino)-8-trifluoromethyl-quinoline and its hydrochloride.

8. The method of claim 2 which is selected from the group consisting of 4-(2'-methoxycarbonyl-thienyl-3'-amino)-7-chloro-quinoline and its hydrochloride.

9. The method of claim 2 which is selected from the group consisting of 4-(3'-α-glyceryloxycarbonyl-thienyl-2'-amino)-8-trifluoromethyl-quinoline and its hydrochloride.

10. The method of claim 2 which is selected from the group consisting of 4-(2'-α-glyceryloxycarbonyl-thienyl-3'-amino)-7-chloro-quinoline and its hydrochloride.

11. The method of claim 2 which is selected from the group consisting of 4-(2'-dimethylaminoethoxycarbonyl-thienyl-3'-amino)-8-trifluoromethyl-quinoline and its dihydrochloride.

12. The method of claim 2 which is 4-(2'-carboxy-thienyl-3'-amino)-8-trifluoromethyl-quinoline.

13. The method of claim 2 which is 4-(3'-carboxy-thienyl-4'-amino)-8-trifluoromethyl-quinoline.

14. The method of claim 2 which is the acetonide of 4-(3'-α-glyceryloxycarbonyl-thienyl-4'-amino)-8-trifluoromethyl-quinoline.

15. The method of claim 2 which is 4-(3'-carboxy-5'-methyl-thienyl-2'-amino)-8-trifluoromethyl-quinoline.

16. The method of claim 2 which is 4-(2'-carboxy-thienyl-3'-amino)-7-chloro-quinoline.

17. The method of claim 2 which is the acetonide of 4-(3'-α-glyceryloxycarbonyl-5'-methyl-thienyl-2'-amino)-8-trifluoromethyl-quinoline.

18. The method of claim 2 which is the acetonide of 4-(-2'-α-glyceryloxycarbonyl-thienyl-3'-amino)-7-chloro-quinoline.

19. The method of claim 2 which is the acetonide of 4-(2'-α-glyceryloxycarbonyl-thienyl-3'-amino)-8-trifluoromethyl-quinoline.

* * * * *

UNITED STATES PATENT OFFICE
CERTIFICATE OF CORRECTION

Patent No. 3,856,909     Dated Dec. 24, 1974

Inventor(s) ANDRE ALLAIS, JEAN MEIER and JEAN CEREDE

It is certified that error appears in the above-identified patent and that said Letters Patent are hereby corrected as shown below:

Col.   Line

Assignee "Ranssel Uclaf" should be

--Roussel Uclaf--

1      14     Under Abstract 3rd formula

" 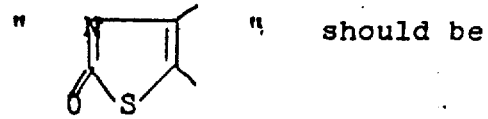 "  should be

-- 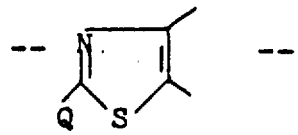 --

1      20     "$Z^-$, $R_3$ and $R_4$" should be

--$Z^{\ominus}$, $R_3$ and $R_4$ --

UNITED STATES PATENT OFFICE
CERTIFICATE OF CORRECTION

Patent No. 3,856,909    Dated Dec. 24, 1974

Inventor(s) ANDRE ALLAIS, JEAN MEIER and JEAN CEREDE

It is certified that error appears in the above-identified patent and that said Letters Patent are hereby corrected as shown below:

Patent

| Col. | Line | | |
|---|---|---|---|
| 1 | 50 | "  " should be -- 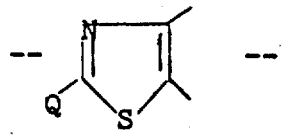 -- |
| 1 | 65 | "Z⁻, $R_3$ and $R_4$" should be --$Z^\ominus$, $R_3$ and $R_4$-- |
| 2 | 39 | "αglycerloxycarbonyl" should be -- α-glyceryloxycarbonyl -- |
| 10 | 22 | "500" should be --500γ-- |
| 10 | 54 | Cancel "aponerosis" |

UNITED STATES PATENT OFFICE
CERTIFICATE OF CORRECTION

Page 3 of 3

Patent No. 3,856,909      Dated Dec. 24, 1974

Inventor(s) ANDRE ALLAIS, JEAN MEIER and JEAN CEREDE

It is certified that error appears in the above-identified patent and that said Letters Patent are hereby corrected as shown below:

Patent

| Col. | Line | |
|---|---|---|
| 12 | 21 | "$Z^-$, $R_3$ and $R_4$" should be --$Z^\ominus$, $R_3$ and $R_4$-- |
| 13 | 12 | "$Z^-$, $R_3$ and $R_4$" should be --$Z^\ominus$, $R_3$ and $R_4$-- |
| 13 | 21 | "pharmaceuitcally" should be --pharmaceutically-- |
| 13 | 33 | "8-trifluoromethyl and its hydrochlorid should be --8-trifluoromethyl-quinoline and its hydrochloride-- |

Signed and Sealed this twenty-second Day of July 1975

[SEAL]

Attest:

RUTH C. MASON
*Attesting Officer*

C. MARSHALL DANN
*Commissioner of Patents and Trademarks*